United States Patent [19]

Koyama et al.

[11] Patent Number: 5,384,143

[45] Date of Patent: Jan. 24, 1995

[54] PROCESS FOR THE PRODUCTION OF CANNED COFFEE

[75] Inventors: Masahiro Koyama; Shigeo Shinkawa, both of Kanagawa, Japan

[73] Assignee: The Coca-Cola Company, Atlanta, Ga.

[21] Appl. No.: 83,315

[22] Filed: Jun. 29, 1993

Related U.S. Application Data

[63] Continuation of Ser. No. 651,377, filed as PCT/JP90/00828, Jun. 26, 1990, abandoned.

[30] Foreign Application Priority Data

Jun. 27, 1989 [JP] Japan .................. 1-162807

[51] Int. Cl.⁶ .................................. A23F 5/26
[52] U.S. Cl. .................. 426/546; 426/433; 426/407; 426/594; 426/397
[58] Field of Search .............. 426/397, 407, 399, 401, 426/432–434, 594, 546, 541, 544

[56] References Cited

U.S. PATENT DOCUMENTS

| | | | |
|---|---|---|---|
| 2,291,604 | 8/1942 | Baselt | 426/432 |
| 2,333,898 | 11/1943 | Stevenson et al. | 426/397 |
| 2,454,510 | 11/1948 | Heyman | 426/432 |
| 2,497,721 | 2/1950 | Foulkes | 426/432 |
| 2,620,276 | 12/1952 | Heyman | 426/594 |
| 2,626,558 | 1/1953 | Stein | 426/397 |
| 2,759,307 | 8/1956 | Eolkin | 426/397 |
| 2,828,684 | 4/1958 | Graham et al. | 426/433 |
| 3,119,695 | 1/1964 | Kahan | 426/432 |
| 3,261,507 | 7/1966 | Cornelius | 426/594 |
| 3,536,496 | 10/1970 | Paoloni | 426/432 |
| 3,830,940 | 8/1974 | Sivetz | 426/433 |
| 3,974,758 | 8/1976 | Stone | 426/433 |
| 3,987,941 | 10/1976 | Blessing | 426/433 |
| 4,093,751 | 6/1978 | Ueshima | 426/594 |
| 4,363,262 | 12/1982 | Pinckley et al. | 426/433 |
| 4,526,797 | 7/1985 | Stone | 426/433 |
| 4,618,500 | 10/1986 | Forquer | 426/432 |
| 4,703,609 | 11/1987 | Yoshida et al. | 426/397 |
| 4,798,732 | 1/1989 | Osawa | 486/594 |
| 4,805,768 | 2/1989 | Nishiguchi et al. | |
| 4,869,047 | 9/1989 | Nishiguchi et al. | |
| 4,980,182 | 12/1990 | Kwon | 426/594 |

FOREIGN PATENT DOCUMENTS

| | | | |
|---|---|---|---|
| 2047861 | 3/1972 | Germany | 426/432 |
| 3339839A1 | 8/1984 | Germany . | |
| 3538810A1 | 5/1986 | Germany . | |
| 2089191 | 6/1982 | United Kingdom | 426/397 |
| 2134496 | 8/1984 | United Kingdom . | |

*Primary Examiner*—Steven Weinstein
*Attorney, Agent, or Firm*—Birch, Stewart, Kolasch & Birch

[57] ABSTRACT

A process for the production of canned coffee, having the steps of:

(1) preparing a cold extract of coffee by rapidly cooling a coffee extract at a temperature no higher than about 20° C.;

(2) adding at least one antioxidant selected from the group consisting of erythorbic acid, ascorbic acid and water-soluble salts thereof to said cold extract, optionally followed by diluting the resulting mixture;

(3) filling the cold extract containing the at least one antioxidant in a can without heating; and (4) replacing air contained in the can with a mixed gas comprising at least two members selected from the group consisting of steam, carbon dioxide gas, and nitrogen gas.

4 Claims, No Drawings

PROCESS FOR THE PRODUCTION OF CANNED COFFEE

This applications is a continuation of application Ser. No. 07/651,377 filed as PCT/JP90/00828, Jun. 26, 1990, now abandoned.

BACKGROUND OF THE INVENTION

1. Technical of the Invention

The present invention relates to a process for the production of canned coffee drink. More particularly, it relates to a process for the production of canned coffee drink which has good flavor, taste and color of coffee and retains fresh-brewed aroma.

DESCRIPTION OF RELATED ART

Conventionally, various proposals have been made on the process for the production of canned drink as described below.

Japanese Patent Publication (Kokai) No. Sho 51-85881 discloses a process for the prevention of putrefaction of a liquid content in a container by sealing a container filled with a liquid content in an atmosphere of steam to prevent the penetration of air and contamination of bacteria which exist in air as being entrained therein.

Japanese Patent Publication (Kokai) No. Sho 58-31939 discloses a process for the long-term retention of a coffee extract without deteriorating its aroma by incorporating carbon dioxide gas or dry ice in a container filled with a coffee extract to establish a carbon dioxide atmosphere and refrigerating the extract at a temperature of about 10° C.

Japanese Patent Publication (Kokai) No. Sho 61-124361 discloses a process for the production of canned drink contained in a can in which negative pressure nitrogen gas is sealed, and which can has a degree of vacuum of no lower than 10 cmHg at 40° C after sealing and is suitable for tapping tests, by replacing at least a portion of oxygen in the head space of the can and in the drink with nitrogen gas.

Japanese Patent Publication (Kokai) No. Sho 61-190403 discloses a process for the production of canned drink by filling spumous drink containing no carbon dioxide in a metal can at a temperature near room temperature and then replacing air in the head space of the can with carbon dioxide gas.

Japanese Patent Publication (Kokai) No. Sho 62-14777 discloses a process for the production of canned alcoholic drink containing 0.005 to 0.3% by weight of ascorbic acid, erythorbic acid or water-soluble salt thereof.

Japanese Patent Publication (Kokai) No. Sho 62-44137 proposes the production of a coffee extract which has excellent aroma and storage stability by adding an alkali metal salt of L-ascorbic acid to a coffee extract.

Japanese Patent Publication (Kokai) No. Sho 63-84466 discloses a process for filling food or drink in cans by filling contents in cans at a sterilization temperature such as 60° to 100° C., and then supplying a mixed gas comprising nitrogen gas and carbon dioxide gas in the head space in the cans, followed by sealing to obtain a desired degree of vacuum.

However, as the result of intensive investigation by the present inventors, it has now been revealed that none of the above-described processes is always capable of sufficiently developing or retaining fresh-brewed aroma (flavor and taste) of coffee, particularly after long-term retention of the drink at either elevated temperatures or at room temperature.

SUMMARY OF THE INVENTION

Therefore, it is an object of the present invention to provide a process for the production of canned coffee drink which has fresh-brewed aroma of coffee.

It is another object of the present invention to provide a process for the production of canned coffee drink which is capable of long-term retention of fresh-brewed aroma and quality of coffee.

It is still another object of the present invention to provide a process for the production of canned coffee drink in which cans are used that are suitable for tapping testing for the examination of the degree of vacuum in the sealed cans.

Other objects and features of the present invention will be apparent from the following description.

DETAILED DESCRIPTION OF PREFERRED EMBODIMENTS

According to the present invention, the above-described objects and features are accomplished by a process for the production of canned coffee, comprising:

(1) preparing a cold extract of coffee by rapidly cooling a coffee extract at a temperature no higher than about 20° C.;

(2) adding at least one antioxidant selected from the group consisting of erythorbic acid, ascorbic acid and water-soluble salts thereof to the cold extract, optionally followed by diluting the resulting mixture;

(3) filling the cold extract containing the at least one antioxidant in a can without heating; and (4) replacing air contained in the can with a mixed gas comprising at least two members selected from the group consisting of steam, carbon dioxide gas, and nitrogen gas.

According to the process of the present invention, coffee powder of roasted and pulverized coffee beans is extracted with hot water to obtain coffee extract at a high temperature, which then is rapidly cooled down to a temperature no higher than about 20° C., for instance, usually at a temperature in the range of from 10 to 20° C. Any means may be used for the rapid cooling of the high temperature coffee extract. For example, the rapid cooling can be performed efficiently by using a cooler which is called a "plate cooler".

Then, at least one antioxidant selected from the group consisting of erythorbic acid, ascorbic acid and water-soluble salts thereof is added to the cooled extract thus prepared. The cooled extract may if desired be diluted appropriately until its concentration reaches a level which is suitable for drinking. It is preferred that the antioxidant be added to the extract having a concentration suitable for drinking in a concentration of about 0.1 to 0.01% by weight.

In addition thereto, the coffee extract may contain various additives such as pH adjusters, sugar and milk, if desired. The additives, if added, can be added to the coffee extract advantageously in the same step as that in which the antioxidant is added in order to minimize complicated operations.

A preferred example of the pH adjuster which can be used is sodium bicarbonate.

The cooled extract thus adjusted and containing the antioxidant is then filled in a container for canning as it is without heating in contrast to ordinary filling techniques in which cooled extracts are heated again to elevated temperatures before filling.

The container for canning filled with the coffee extract is then subjected to replacing of air therein with a mixed gas. The mixed gas comprises at least two members selected from the group consisting of steam, carbon dioxide gas and nitrogen gas. The use of the mixed gas enables reduction of the amount of air remaining in the hermetically seamed can to a level as low as possible, thereby preventing oxidation of the coffee extract with oxygen in the air remaining in the can. In addition, after the hermetical seaming, a portion of the mixed gas is dissolved in the coffee extract in the can to form appropriate negative pressure in the can, which makes it possible to perform tapping tests after the hermetical seaming advantageously.

The replacement of air in the can with the mixed gas is performed by continuously passing containers for canning one after another under a nozzle which is spouting the mixed gas. Thereafter, the cans are tightly seamed rapidly. The tightly seamed cans containing coffee drink are usually subjected to sterilization treatment (for example, at 115° C. for 20 minutes), cooled and shipped as final beverage products.

The present invention will be described in greater detail with reference to examples which should in no way be construed as limiting the present invention.

EXAMPLE 1

Roasted, pulverized coffee (96 kg) was charged in an extractor and extracted with sprayed hot water at 98° C. The extract was rapidly cooled down to about 18° C. and supplied to a mixing tank in which 1 kg of erythorbic acid, 1 kg of sodium bicarbonate and 15 kg of sugar and water were added to prepare 2,000 liters of coffee extract.

The coffee extract was filled in a can (250 ml, three piece necked in TFS can) as it is without heating and air in the head space was replaced with either one of a mixed gas composed of nitrogen gas and steam, a mixed gas composed of nitrogen gas and carbon dioxide gas, or a mixed gas composed of carbon dioxide gas and steam. Immediately thereafter, the can was sealed and sterilized by retorting at 115° C. for 20 minutes, followed by cooling to produce canned coffee drink.

In the above-described process, the filling of the coffee extract, replacement of air with the mixed gas and sealing of the can were performed continuously at a speed of 515 cans/minute.

Table 1 shows conditions of replacing air in the head space (kind and flow rate of mixed gases) and degree of pressure reduction (cmHg) immediately after the production of canned coffee drink (final beverage product) as well as the total amount (ml/100 ml) of oxygen in the can, in the case where mocha blend was used as the coffee.

Table 2 shows conditions similar to those shown in Table 1 above and results obtained in the case where kirimanjaro blend was used as the coffee.

It should be noted that Runs Nos. Mo-1 and Mo-11 in Table 1 and Runs Nos. Ki-1 and Ki-11 are comparative examples, respectively.

TABLE 1

| | Mixed Gas Used | | | | Canned Coffee Drink (Immediately After Production) | |
|---|---|---|---|---|---|---|
| Run No. | Kind | Flow Rate (l/minute) | Kind | Flow Rate (l/minute) | Degree of Pressure Reduction (cmHg) | Total Amount of Oxygen in the Can (ml/100 ml) |
| Mo-1 | steam | 150 | — | — | 30 | 0.42 |
| Mo-2 | " | " | $CO_2$ | 50 | 36 | 0.24 |
| Mo-3 | " | " | " | 100 | 37 | 0.21 |
| Mo-4 | " | " | " | 150 | 38 | 0.19 |
| Mo-5 | " | 400 | $N_2$ | 10 | 30 | 0.25 |
| Mo-6 | " | " | " | 25 | 30 | 0.20 |
| Mo-7 | " | " | " | 50 | 28 | 0.15 |
| Mo-8 | $CO_2$ | 120 | " | 80 | 16 | 0.15 |
| Mo-9 | " | 160 | " | 40 | 27 | 0.16 |
| Mo-10 | " | 180 | " | 20 | 32 | 0.14 |
| Mo-11*[1] | — | — | — | — | 27 | 0.74 |

*[1]Coffee extract was filled at 88° C. but replacement of air with the mixed gas was not performed.

TABLE 2

| | Mixed Gas Used | | | | Canned Coffee Drink (Immediately After Production) | |
|---|---|---|---|---|---|---|
| Run No. | Kind | Flow Rate (l/minute) | Kind | Flow Rate (l/minute) | Degree of Pressure Reduction (cmHg) | Total Amount of Oxygen in the Can (ml/100 ml) |
| Ki-1 | — | — | $CO_2$ | 100 | 25 | 0.31 |
| Ki-2 | steam | 80 | " | " | 28 | 0.23 |
| Ki-3 | " | 160 | " | " | 30 | 0.25 |
| Ki-4 | " | 240 | " | " | 32 | 0.25 |
| Ki-5 | " | 400 | $N_2$ | 10 | 31 | 0.31 |
| Ki-6 | " | " | " | 25 | 26 | 0.19 |
| Ki-7 | " | " | " | 50 | 26 | 0.15 |

TABLE 2-continued

| | Mixed Gas Used | | | Canned Coffee Drink (Immediately After Production) | |
|---|---|---|---|---|---|
| Run No. | Kind | Flow Rate (l/minute) | Kind | Flow Rate (l/minute) | Degree of Pressure Reduction (cmHg) | Total Amount of Oxygen in the Can (ml/100 ml) |
| Ki-8 | $CO^2$ | 120 | " | 80 | 18 | 0.17 |
| Ki-9 | " | 160 | " | 40 | 25 | 0.17 |
| Ki-10 | " | 180 | " | 20 | 31 | 0.19 |
| Ki-11*[1] | — | — | — | — | 32 | 0.71 |

*[1] Coffee extract was filled at 88° C. but replacement of air with the mixed gas was not performed.

EXAMPLE 2

The degree of vacuum and pH of canned coffee drink corresponding to the respective run numbers obtained in Example 1 were examined chronologically.

The results obtained are shown in Tables 3 and 4.

EXAMPLE 3

The total amount of oxygen in the can and transmittance of canned coffee drink samples corresponding to the respective run numbers obtained in Example 1 were examined periodically.

TABLE 3

| | Degree of Vacuum | | | | pH | | | |
|---|---|---|---|---|---|---|---|---|
| Run No. | Room Temperature After 1 week | 55° C., After 3 days | 55° C., After 1 week | Room Temperature After 1 month | Room Temperature After 1 week | 55° C., After 3 days | 55° C., After 1 week | Room Temperature After 1 month |
| Mo-1 | 31 | 27 | 31 | 26 | 5.6 | 5.4 | 5.4 | 5.5 |
| Mo-2 | 33 | 30 | 30 | 29 | " | " | " | " |
| Mo-3 | 35 | 31 | 32 | 30 | " | " | " | " |
| Mo-4 | 34 | 31 | 29 | 31 | " | " | 5.3 | " |
| Mo-5 | 30 | 24 | 30 | 28 | " | " | " | " |
| Mo-6 | 27 | 23 | 27 | 27 | " | " | " | " |
| Mo-7 | 31 | 23 | 22 | 26 | " | " | " | " |
| Mo-8 | 16 | 13 | 14 | 14 | " | " | " | " |
| Mo-9 | 25 | 21 | 23 | 24 | " | " | " | " |
| Mo-10 | 29 | 26 | 27 | 27 | " | 5.3 | " | 5.4 |
| Mo-11 | 39 | 38 | 27 | 37 | 5.3 | 5.2 | 5.2 | 5.3 |

TABLE 4

| | Degree of Vacuum | | | | pH | | | |
|---|---|---|---|---|---|---|---|---|
| Run No. | Room Temperature After 1 week | 55° C., After 3 days | 55° C., After 1 week | Room Temperature After 1 month | Room Temperature After 1 week | 55° C., After 3 days | 55° C., After 1 week | Room Temperature After 1 month |
| Ki-1 | 21 | 19 | 20 | 18 | 5.3 | 5.2 | 5.1 | 5.3 |
| Ki-2 | 23 | 19 | 21 | 20 | " | " | " | " |
| Ki-3 | 25 | 22 | 24 | 22 | 5.4 | " | " | " |
| Ki-4 | 27 | 24 | 26 | 25 | " | " | " | " |
| Ki-5 | 30 | 27 | 29 | 28 | " | " | " | " |
| Ki-6 | 24 | 23 | 22 | 21 | 5.3 | " | " | " |
| Ki-7 | 24 | 19 | 25 | 22 | " | " | " | " |
| Ki-8 | 17 | 14 | 15 | 17 | 5.4 | " | " | " |
| Ki-9 | 21 | 18 | 21 | 22 | 5.3 | " | " | " |
| Ki-10 | 30 | 25 | 27 | 23 | " | 5.1 | " | 5.2 |
| Ki-11 | 38 | 36 | 27 | 37 | 5.2 | " | 5.0 | " |

The results obtained are shown in Table 5 and 6.

TABLE 5

| | Total Amount of Oxygen in the Can (ml/100 ml) | | | | Transmittance (660 nm) | | | | | | | |
|---|---|---|---|---|---|---|---|---|---|---|---|---|
| | | | | | Room Temperature After 1 week | | 55° C., After 3 days | | 55° C., After 1 week | | Room Temperature After 1 month | |
| Run No. | Immediately After Production | 55° C., After 3 days | 55° C., After 1 week | Room Temperature After 1 month | % | ΔT* | % | ΔT* | % | ΔT* | % | ΔT* |
| Mo-1 | 0.42 | 0.03 | 0.04 | 0.03 | 36.5 | 6.6 | 40.0 | 10.1 | 35.3 | 5.4 | 39.6 | 9.7 |
| Mo-2 | 0.24 | 0.04 | 0.05 | 0.04 | 38.1 | 8.2 | 41.1 | 11.1 | 35.8 | 5.9 | 40.3 | 10.4 |
| Mo-3 | 0.21 | 0.05 | 0.06 | 0.04 | 38.7 | 8.8 | 41.8 | 11.9 | 35.7 | 5.8 | 40.4 | 10.5 |
| Mo-4 | 0.19 | 0.03 | 0.05 | 0.03 | 37.8 | 7.9 | 41.5 | 11.6 | 35.8 | 5.9 | 39.7 | 9.8 |
| Mo-5 | 0.25 | 0.04 | 0.05 | 0.04 | 37.4 | 7.5 | 40.2 | 10.3 | 35.1 | 5.2 | 38.7 | 8.8 |
| Mo-6 | 0.20 | 0.04 | 0.03 | 0.04 | 37.2 | 7.3 | 40.6 | 10.7 | 34.8 | 4.9 | 38.3 | 8.4 |
| Mo-7 | 0.15 | 0.03 | 0.04 | 0.04 | 37.0 | 7.1 | 40.2 | 10.3 | 32.8 | 2.1 | 38.3 | 8.4 |
| Mo-8 | 0.15 | 0.03 | 0.04 | 0.04 | 37.4 | 7.5 | 39.3 | 9.4 | 32.4 | 2.5 | 38.9 | 9.0 |
| Mo-9 | 0.16 | 0.04 | 0.03 | 0.04 | 37.4 | 7.5 | 39.8 | 9.9 | 32.8 | 2.9 | 38.2 | 8.3 |
| Mo-10 | 0.14 | 0.03 | 0.04 | 0.04 | 37.3 | 7.4 | 40.0 | 10.1 | 34.0 | 4.1 | 38.7 | 8.8 |

TABLE 5-continued

| | Total Amount of Oxygen in the Can (ml/100 ml) | | | | Transmittance (660 nm) | | | | | | | |
|---|---|---|---|---|---|---|---|---|---|---|---|---|
| | Immediately After | 55° C., After | 55° C., After | Room Temperature | Room Temperature After 1 week | | 55° C., After 3 days | | 55° C., After 1 week | | Room Temperature After 1 month | |
| Run No. | Production | 3 days | 1 week | After 1 month | % | ΔT* | % | ΔT* | % | ΔT* | % | ΔT* |
| Mo-11 | 0.74 | 0.06 | 0.07 | 0.05 | 29.9 | — | 31.2 | 1.3 | 29.1 | −0.8 | 38.3 | 0.4 |

*Values of ΔT are each a difference between transmittance measured and that of Mo-11 obtained after 1 week at room temperature.

TABLE 6

| | Total Amount of Oxygen in the Can (ml/100 ml) | | | | Transmittance (660 nm) | | | | | | | |
|---|---|---|---|---|---|---|---|---|---|---|---|---|
| | Immediately After | 55° C., After | 55° C., After | Room Temperature | Room Temperature After 1 week | | 55° C., After 3 days | | 55° C., After 1 week | | Room Temperature After 1 month | |
| Run No. | Production | 3 days | 1 week | After 1 month | % | ΔT* | % | ΔT* | % | ΔT* | % | ΔT* |
| Ki-1 | 0.31 | 0.05 | 0.04 | 0.05 | 30.5 | 15.3 | 33.9 | 18.7 | 29.5 | 14.3 | 34.6 | 19.4 |
| Ki-2 | 0.23 | 0.05 | 0.04 | 0.04 | 32.6 | 17.4 | 34.2 | 19.0 | 29.5 | 14.3 | 35.3 | 20.1 |
| Ki-3 | 0.25 | 0.05 | 0.04 | 0.03 | 31.0 | 15.8 | 33.7 | 18.5 | 30.1 | 14.9 | 33.7 | 18.5 |
| Ki-4 | 0.25 | 0.05 | 0.04 | 0.04 | 32.3 | 17.1 | 34.5 | 19.3 | 26.5 | 11.3 | 34.3 | 19.1 |
| Ki-5 | 0.31 | 0.05 | 0.05 | 0.04 | 30.0 | 14.8 | 34.4 | 19.2 | 28.9 | 13.7 | 32.7 | 17.5 |
| Ki-6 | 0.19 | 0.04 | 0.04 | 0.04 | 29.1 | 13.9 | 35.1 | 19.9 | 28.0 | 12.8 | 32.1 | 16.9 |
| Ki-7 | 0.15 | 0.03 | 0.04 | 0.03 | 28.9 | 13.7 | 33.7 | 18.5 | 28.3 | 13.1 | 27.8 | 12.8 |
| Ki-8 | 0.17 | 0.03 | 0.04 | 0.03 | 30.3 | 15.1 | 32.4 | 17.2 | 29.5 | 14.3 | 30.0 | 14.8 |
| Ki-9 | 0.17 | 0.03 | 0.04 | 0.03 | 30.4 | 15.2 | 33.4 | 18.2 | 26.9 | 11.7 | 30.1 | 14.9 |
| Ki-10 | 0.19 | 0.04 | 0.04 | 0.04 | 26.2 | 11.0 | 31.2 | 16.0 | 25.6 | 10.4 | 27.0 | 11.8 |
| Ki-11 | 0.71 | 0.05 | 0.07 | 0.05 | 15.2 | — | 21.0 | 5.8 | 20.8 | 5.6 | 15.2 | 0 |

*Values of ΔT are each a difference between transmittance measured and that of Ki-11 obtained after 1 week at room temperature.

EXAMPLE 4

The color of canned coffee drink samples corresponding to the respective run numbers obtained in Example 1 ere examined periodically according to the standard L, a and b of Hunter scale.

ples, i.e., Runs Nos. Mo-3, Mo-5 and Mo-10 (Table 1), Runs Nos. Ki-3, Ki-5 and Ki-10 (Table 2) and Runs Nos. Mo-11 and Ki-11 as comparison, each prepared in Example 1. Tables 9 and 10 show results obtained on the canned coffee drink samples immediately after the production thereof.

TABLE 7

| | Room Temperature After 1 week | | | | 55° C., After 3 days | | | | 55° C., After 1 week | | | | Room Temperature After 1 month | | | |
|---|---|---|---|---|---|---|---|---|---|---|---|---|---|---|---|---|
| Run No. | L | a | b | *ΔE | L | a | b | *ΔE | L | a | b | *ΔE | L | a | b | *ΔE |
| Mo-1 | 37.2 | 21.3 | 25.4 | 8.57 | 38.4 | 21.5 | 26.2 | 10.01 | 36.2 | 20.5 | 24.8 | 6.14 | 38.5 | 21.7 | 26.3 | 10.16 |
| Mo-2 | 37.2 | 21.3 | 25.5 | 8.63 | 39.0 | 21.5 | 26.6 | 10.74 | 37.0 | 20.4 | 25.3 | 6.95 | 39.0 | 21.7 | 26.6 | 10.75 |
| Mo-3 | 38.1 | 21.4 | 26.1 | 9.71 | 39.3 | 21.6 | 26.9 | 11.16 | 36.7 | 20.5 | 25.2 | 8.24 | 39.1 | 21.7 | 26.7 | 10.88 |
| Mo-4 | 37.5 | 21.3 | 25.7 | 8.99 | 39.1 | 21.5 | 26.7 | 10.88 | 36.7 | 20.5 | 25.0 | 7.96 | 38.8 | 21.7 | 26.5 | 10.52 |
| Mo-5 | 37.5 | 21.1 | 25.7 | 8.99 | 38.2 | 21.7 | 26.1 | 9.80 | 36.3 | 20.4 | 24.8 | 7.53 | 38.1 | 21.7 | 26.0 | 9.66 |
| Mo-6 | 37.5 | 21.4 | 25.6 | 8.93 | 38.4 | 21.5 | 26.2 | 10.02 | 36.0 | 20.4 | 24.6 | 7.17 | 37.9 | 21.7 | 25.9 | 9.44 |
| Mo-7 | 37.6 | 21.2 | 25.7 | 9.07 | 38.4 | 21.4 | 26.3 | 10.07 | 34.9 | 20.1 | 23.9 | 5.93 | 38.3 | 21.7 | 26.2 | 9.94 |
| Mo-8 | 37.3 | 21.4 | 25.6 | 8.77 | 38.1 | 21.4 | 26.1 | 9.71 | 35.3 | 20.1 | 24.1 | 6.36 | 38.3 | 21.7 | 26.2 | 9.94 |
| Mo-9 | 37.3 | 21.3 | 25.5 | 8.71 | 38.4 | 21.5 | 26.3 | 10.07 | 35.4 | 20.1 | 24.2 | 6.50 | 38.0 | 21.7 | 26.0 | 9.58 |
| Mo-10 | 37.2 | 21.5 | 25.4 | 8.58 | 38.4 | 21.5 | 26.2 | 10.02 | 36.0 | 20.5 | 24.6 | 7.16 | 37.9 | 21.6 | 25.9 | 9.44 |
| Mo-11 | 30.1 | 21.2 | 20.6 | — | 30.7 | 21.2 | 21.0 | 0.72 | 29.7 | 20.5 | 20.3 | 0.86 | 30.9 | 21.4 | 21.2 | 1.02 |

*Values of ΔE are each a difference between the value obtained and L, a or b of Mo-11 as a standard value.

TABLE 8

| | Room Temperature After 1 week | | | | 55° C., After 3 days | | | | 55° C., After 1 week | | | | Room Temperature After 1 month | | | |
|---|---|---|---|---|---|---|---|---|---|---|---|---|---|---|---|---|
| Run No. | L | a | b | *ΔE | L | a | b | *ΔE | L | a | b | *ΔE | L | a | b | *ΔE |
| Ki-1 | 32.7 | 21.7 | 22.4 | 14.13 | 33.4 | 21.5 | 22.9 | 14.89 | 31.1 | 20.4 | 21.3 | 11.91 | 33.6 | 22.0 | 23.0 | 15.49 |
| Ki-2 | 33.1 | 21.6 | 22.7 | 15.30 | 33.8 | 21.6 | 23.1 | 15.28 | 30.9 | 20.3 | 21.2 | 11.67 | 34.2 | 22.1 | 23.4 | 15.97 |
| Ki-3 | 32.3 | 21.5 | 22.1 | 13.60 | 33.5 | 21.5 | 23.0 | 15.03 | 31.6 | 20.5 | 21.6 | 12.49 | 33.3 | 21.8 | 22.8 | 14.85 |
| Ki-4 | 33.4 | 21.7 | 22.9 | 14.95 | 33.5 | 21.4 | 22.9 | 14.94 | 29.2 | 19.6 | 20.0 | 9.49 | 33.5 | 22.0 | 23.0 | 15.12 |
| Ki-5 | 31.7 | 21.2 | 21.8 | 12.88 | 33.6 | 21.5 | 23.0 | 15.10 | 30.9 | 20.2 | 21.2 | 11.65 | 32.8 | 21.6 | 22.5 | 14.24 |
| Ki-6 | 31.8 | 21.0 | 21.8 | 12.90 | 34.0 | 21.6 | 23.3 | 15.61 | 30.3 | 20.0 | 20.7 | 10.81 | 32.6 | 21.4 | 22.4 | 13.97 |
| Ki-7 | 31.5 | 20.9 | 21.5 | 12.53 | 33.5 | 21.4 | 22.9 | 14.94 | 30.2 | 19.8 | 20.7 | 10.72 | 30.6 | 20.5 | 21.0 | 11.38 |
| Ki-8 | 33.0 | 21.4 | 22.6 | 15.11 | 32.7 | 21.2 | 22.4 | 13.79 | 30.9 | 20.0 | 21.1 | 11.54 | 31.7 | 21.1 | 21.7 | 12.79 |
| Ki-9 | 32.3 | 21.2 | 22.1 | 14.34 | 33.4 | 21.4 | 22.9 | 14.87 | 29.9 | 19.7 | 20.5 | 10.35 | 31.5 | 21.0 | 21.6 | 12.55 |
| Ki-10 | 29.9 | 20.4 | 20.5 | 10.53 | 32.0 | 21.3 | 21.9 | 13.19 | 28.5 | 19.5 | 19.6 | 8.70 | 29.8 | 19.4 | 20.4 | 10.14 |
| Ki-11 | 22.3 | 17.3 | 13.9 | — | 23.6 | 19.3 | 16.2 | 3.31 | 23.2 | 17.1 | 15.9 | 2.84 | 20.3 | 17.4 | 13.9 | 2.00 |

*Values of ΔE are each a difference between the value obtained and L, a or b of Ki-11 as a standard value.

EXAMPLE 5

Organoleptic tests by a panel of 15 experienced examiners were performed on the canned coffee drink sam-

TABLE 9

(Immediately After Production)

Evaluation In comparison with Mo-11

| | Sample | Very Good | Good | Equivalent | Poor | Very Poor |
|---|---|---|---|---|---|---|
| Total | Mo-3 | 2 persons | 9 persons | 3 persons | 1 person | 0 |
| | Mo-5 | 5 persons | 8 persons | 0 | 2 persons | 0 |
| | Mo-10 | 3 persons | 10 persons | 2 persons | 0 | 0 |
| Flavor | Mo-3 | 2 persons | 8 persons | 2 persons | 3 persons | 0 |
| | Mo-5 | 4 persons | 7 persons | 2 persons | 2 persons | 0 |
| | Mo-10 | 5 persons | 5 persons | 5 persons | 0 | 0 |
| Taste | Mo-3 | 3 persons | 7 persons | 5 persons | 0 | 0 |
| | Mo-5 | 4 persons | 5 persons | 4 persons | 2 persons | 0 |
| | Mo-10 | 4 persons | 8 persons | 2 persons | 0 | 0 |

TABLE 10

(Immediately After Production)

Evaluation In comparison with Ki-11

| | Sample | Very Good | Good | Equivalent | Poor | Very Poor |
|---|---|---|---|---|---|---|
| Total | Ki-3 | 3 persons | 7 persons | 1 person | 4 persons | 0 |
| | Ki-5 | 2 persons | 8 persons | 2 persons | 2 persons | 1 person |
| | Ki-10 | 3 persons | 7 persons | 0 | 5 persons | 0 |
| Flavor | Ki-3 | 0 | 8 persons | 2 persons | 5 persons | 0 |
| | Ki-5 | 2 persons | 9 persons | 2 persons | 1 person | 1 person |
| | Ki-10 | 4 persons | 6 persons | 0 | 5 persons | 0 |
| Taste | Ki-3 | 3 persons | 6 persons | 2 persons | 4 persons | 0 |
| | Ki-5 | 2 persons | 7 persons | 4 persons | 1 person | 1 person |
| | Ki-10 | 3 persons | 5 persons | 3 persons | 4 persons | 0 |

Furthermore, the above-described canned coffee drink samples were each in an incubator at 55° C. for 1 week and at room temperature for 1 month and evaluated in the same manner as above in comparsion with a control sample which was stored in a refrigerator as a standard.

Tables 11 to 14 show the results.

TABLE 11

(55° C., After 1 week)

Evaluation In comparison with Mo-11 Stored in a Refrigerator

| | Sample | Very Good | Good | Equivalent | Poor | Very Poor |
|---|---|---|---|---|---|---|
| Total | Mo-3 | 1 person | 6 persons | 7 persons | 1 person | 0 |
| | Mo-5 | 1 person | 6 persons | 8 persons | 0 | 0 |
| | Mo-10 | 1 person | 8 persons | 6 persons | 0 | 0 |
| | Mo-11 | 0 | 1 person | 9 persons | 5 persons | 0 |
| Flavor | Mo-3 | 1 person | 7 persons | 7 persons | 0 | 0 |
| | Mo-5 | 1 person | 8 persons | 6 persons | 0 | 0 |
| | Mo-10 | 2 persons | 8 persons | 4 persons | 1 person | 0 |
| | Mo-11 | 0 | 1 person | 9 persons | 5 persons | 0 |
| Taste | Mo-3 | 1 person | 5 persons | 7 persons | 2 persons | 0 |
| | Mo-5 | 1 person | 6 persons | 7 persons | 1 person | 0 |
| | Mo-10 | 1 person | 8 persons | 7 persons | 0 | 0 |
| | Mo-11 | 0 | 2 persons | 7 persons | 6 persons | 0 |

TABLE 12

(55° C., After 1 week)

Evaluation In comparison with Ki-11 Stored in a Refrigerator

| | Sample | Very Good | Good | Equivalent | Poor | Very Poor |
|---|---|---|---|---|---|---|
| Total | Ki-3 | 2 persons | 9 persons | 3 persons | 1 person | 0 |
| | Ki-5 | 1 person | 10 persons | 4 persons | 0 | 0 |
| | Ki-10 | 0 | 8 persons | 7 persons | 0 | 0 |
| | Ki-11 | 0 | 3 persons | 8 persons | 4 persons | 0 |
| Flavor | Ki-3 | 1 person | 7 persons | 7 persons | 0 | 0 |
| | Ki-5 | 0 | 9 persons | 6 persons | 0 | 0 |
| | Ki-10 | 0 | 7 persons | 8 persons | 0 | 0 |
| | Ki-11 | 0 | 2 persons | 8 persons | 5 persons | 0 |
| Taste | Ki-3 | 1 person | 6 persons | 7 persons | 0 | 0 |
| | Ki-5 | 1 person | 11 persons | 3 persons | 0 | 0 |
| | Ki-10 | 0 | 6 persons | 9 persons | 0 | 0 |
| | Ki-11 | 0 | 2 persons | 8 persons | 5 persons | 0 |

TABLE 13

(Room Temperature After 1 week)

Evaluation
In comparison with Mo-11 Stored in a Refrigerator

| | Sample | Very Good | Good | Equivalent | Poor | Very Poor |
|---|---|---|---|---|---|---|
| Total | Mo-3 | 3 persons | 9 persons | 3 persons | 0 | 0 |
| | Mo-5 | 0 | 12 persons | 2 persons | 1 person | 0 |
| | Mo-10 | 2 persons | 10 persons | 3 persons | 0 | 0 |
| | Mo-11 | 0 | 2 persons | 9 persons | 4 persons | 0 |
| Flavor | Mo-3 | 2 persons | 10 persons | 3 persons | 0 | 0 |
| | Mo-5 | 1 person | 11 persons | 3 persons | 0 | 0 |
| | Mo-10 | 1 person | 11 persons | 3 persons | 0 | 0 |
| | Mo-11 | 0 | 2 persons | 9 persons | 4 persons | 0 |
| Taste | Mo-3 | 2 persons | 9 persons | 4 persons | 0 | 0 |
| | Mo-5 | 1 person | 10 persons | 3 persons | 1 person | 0 |
| | Mo-10 | 2 persons | 8 persons | 5 persons | 0 | 0 |
| | Mo-11 | 0 | 2 persons | 9 persons | 3 persons | 1 person |

TABLE 14

(Room Temperature After 1 month)

Evaluation
In comparison with Ki-11 Stored in a Refrigerator

| | Sample | Very Good | Good | Equivalent | Poor | Very Poor |
|---|---|---|---|---|---|---|
| Total | Ki-3 | 2 persons | 7 persons | 6 persons | 0 | 0 |
| | Ki-5 | 2 persons | 10 persons | 3 persons | 0 | 0 |
| | Ki-10 | 3 persons | 9 persons | 3 persons | 0 | 0 |
| | Ki-11 | 0 | 2 persons | 10 persons | 3 persons | 0 |
| Flavor | Ki-3 | 2 persons | 7 persons | 6 persons | 0 | 0 |
| | Ki-5 | 1 person | 8 persons | 6 persons | 0 | 0 |
| | Ki-10 | 1 person | 9 persons | 5 persons | 0 | 0 |
| | Ki-11 | 0 | 2 persons | 11 persons | 2 persons | 0 |
| Taste | Ki-3 | 2 persons | 7 persons | 6 persons | 0 | 0 |
| | Ki-5 | 2 persons | 12 persons | 1 person | 0 | 0 |
| | Ki-10 | 3 persons | 9 persons | 3 persons | 0 | 0 |
| | Ki-11 | 0 | 2 persons | 10 persons | 3 persons | 0 |

As will be apparent from the results shown in Tables 11 to 14, the canned coffee drink of the present invention is superior in storage stability at elevated temperature (Tables 11 and 12) and also in stability after long-term retention at room temperature (Tables 13 and 14) to the comparison product filled with coffee extract at 88° C.

Industrial Applicability

The present invention provides an improved process for the production of canned coffee drink which has good flavor, taste and color of fresh-brewed coffee and retains intrinsic fresh-brewed aroma after long-term retention and which is suitable for impact testing for the examination of the degree of vacuum in the sealed cans.

We claim:

1. A process for the production of canned coffee, comprising the steps of:
    (a) preparing a hot coffee extract by extracting coffee beans with hot water to obtain coffee extract at a high temperature;
    (b) preparing a cold extract of coffee by rapidly cooling said hot coffee extract to a temperature between about 10° and about 20° C.;
    (c) adding at least one antioxidant in a concentration about 0.1 to about 0.01% by weight selected from the group consisting of erythorbic acid, ascorbic acid and water-soluble salts thereof to said cold extract;
    (d) filling a can with said cold extract containing said at least one antioxidant without heating said cold extract;
    (e) replacing headspace air contained in said can with a mixed gas comprising at least two gases selected from the group consisting of steam, carbon dioxide gas, and nitrogen gas, a portion of the mixed gas dissolving in the coffee extract to reduce the pressure and create a negative pressure in the can after hermetically sealing the filled can;
    (f) hermetically sealing the filled can containing said mixed gas; and
    (g) sterilizing the sealed can at a temperature of at least 115° C. for about 20 minutes,
    the mixed gas being present in said headspace such that after hemetically sealing the can, the degree of pressure reduction is about 30 cm Hg and the total amount of oxygen in the can is less than 0.3 ml per 100 ml of beverage.

2. The process according to claim 1 wherein said cold extract is diluted subsequent to adding said at least one antioxidant.

3. The process according to claim 1, wherein the step of adding additionally includes adding additives selected from the group consisting of pH adjusters, sugar and milk.

4. The process according to claim 3 wherein the pH adjusters comprises sodium bicarbonate.

* * * * *